US008939173B2

(12) United States Patent
Yahr et al.

(10) Patent No.: US 8,939,173 B2
(45) Date of Patent: Jan. 27, 2015

(54) STEPPER MOTOR OPERATED BALANCED FLOW CONTROL VALVE

(75) Inventors: Paul A. Yahr, Brighton, MI (US); Kevin C. Williams, Wixom, MI (US)

(73) Assignee: MAC Valves, Inc., Wixom, MI (US)

( * ) Notice: Subject to any disclaimer, the term of this patent is extended or adjusted under 35 U.S.C. 154(b) by 851 days.

(21) Appl. No.: 12/836,214

(22) Filed: Jul. 14, 2010

(65) Prior Publication Data

US 2012/0012768 A1     Jan. 19, 2012

(51) Int. Cl.
| F16K 31/04 | (2006.01) |
| F16K 1/02 | (2006.01) |
| F16K 3/00 | (2006.01) |
| F16K 11/065 | (2006.01) |

(52) U.S. Cl.
CPC . *F16K 31/04* (2013.01); *F16K 1/02* (2013.01); *F16K 3/00* (2013.01); *F16K 11/065* (2013.01)
USPC .............. 137/625.2; 137/625.65; 137/625.69; 251/129.11; 251/318; 251/266

(58) Field of Classification Search
USPC ............... 137/625.2, 625.65, 625.27, 625.69; 251/129.11, 129.04, 318, 324
See application file for complete search history.

(56) References Cited

U.S. PATENT DOCUMENTS

| 1,336,026 | A | * | 4/1920 | Dempsey ...................... 251/270 |
| 1,958,988 | A | * | 5/1934 | Eisele ............................ 251/270 |
| 2,938,702 | A | * | 5/1960 | Rosebrook ......................... 251/3 |
| 3,194,266 | A |  | 7/1965 | Abbott et al. |
| 4,068,902 | A |  | 1/1978 | Deem et al. |
| 4,133,510 | A | * | 1/1979 | Lorimor ......................... 251/31 |
| 4,254,687 | A |  | 3/1981 | Alexander |
| 4,437,388 | A |  | 3/1984 | Budzich |
| 4,485,846 | A | * | 12/1984 | Neff ........................... 137/625.64 |
| 4,503,888 | A |  | 3/1985 | Brovold |
| 4,568,499 | A | * | 2/1986 | Wood ............................ 261/41.5 |
| 4,732,174 | A | * | 3/1988 | Ueno ........................ 137/625.38 |
| 4,733,585 | A | * | 3/1988 | Link et al. ......................... 82/133 |

(Continued)

FOREIGN PATENT DOCUMENTS

| JP | 2008-002663 | 1/2008 |
| JP | 2009-030696 | 2/2009 |

OTHER PUBLICATIONS

International Search Report for International Application No. PCT/US2011/043298 mailed Dec. 27, 2011.

(Continued)

*Primary Examiner* — Elizabeth Houston
*Assistant Examiner* — Minh Le
(74) *Attorney, Agent, or Firm* — Harness, Dickey & Pierce, P.L.C.

(57) ABSTRACT

A flow control valve includes a body having a body bore oriented coaxially with a longitudinal axis of the body and a seat member extending into the bore. A valve member is slidably disposed in the bore and oriented coaxially with the longitudinal axis of the body. The valve member includes a non-circular geometrically shaped head having a bore. A drive adapter includes a head receiving cavity slidingly receiving the geometrically shaped head of the valve member and preventing axial rotation of the valve member. A stepper motor is connected to the drive adapter, the stepper motor incrementally rotating a shaft engaged with the bore of the valve member. First and second equal diameter pistons of the valve member provide pressure balanced valve member operating positions.

31 Claims, 9 Drawing Sheets

(56) References Cited

U.S. PATENT DOCUMENTS

| | | | |
|---|---|---|---|
| 4,789,001 A | 12/1988 | Backe et al. | |
| 4,857,034 A | 8/1989 | Kouno et al. | |
| 4,951,549 A * | 8/1990 | Olsen et al. | 91/363 R |
| 5,094,260 A | 3/1992 | Stuart et al. | |
| 5,123,718 A | 6/1992 | Tyler | |
| 5,218,997 A | 6/1993 | Dunwoody | |
| 5,234,265 A | 8/1993 | Tyler | |
| 5,295,429 A | 3/1994 | Monk | |
| 5,318,354 A | 6/1994 | Tyler | |
| 5,327,926 A | 7/1994 | DuLac et al. | |
| 5,522,416 A | 6/1996 | Farrell et al. | |
| 5,579,807 A | 12/1996 | Kohler | |
| 5,722,460 A * | 3/1998 | Olsen et al. | 137/625.65 |
| 6,192,937 B1 * | 2/2001 | Fagerlie et al. | 137/625.63 |
| 6,202,672 B1 | 3/2001 | Ellis et al. | |
| 6,220,284 B1 * | 4/2001 | Hayashi et al. | 137/554 |
| 6,263,915 B1 * | 7/2001 | Hayashi et al. | 137/554 |
| 6,267,140 B1 * | 7/2001 | Hayashi et al. | 137/554 |
| 6,283,149 B1 * | 9/2001 | Hayashi et al. | 137/554 |
| 6,302,145 B1 | 10/2001 | Ellis et al. | |
| 6,419,478 B1 | 7/2002 | Kemp | |
| 6,439,264 B1 | 8/2002 | Ellis et al. | |
| 6,460,567 B1 * | 10/2002 | Hansen et al. | 137/554 |
| 6,467,505 B1 | 10/2002 | Thordarson et al. | |
| 6,543,481 B2 * | 4/2003 | Neff et al. | 137/625.63 |
| 6,622,753 B2 | 9/2003 | Thordarson et al. | |
| 6,637,462 B2 | 10/2003 | Foster, Jr. et al. | |
| 6,644,169 B2 | 11/2003 | Deininger et al. | |
| 7,051,757 B2 | 5/2006 | McMillan et al. | |
| 7,066,189 B2 * | 6/2006 | Tranovich et al. | 137/1 |
| 7,147,006 B2 | 12/2006 | Shaw et al. | |
| 7,159,842 B1 | 1/2007 | Taylor et al. | |
| 7,351,179 B2 | 4/2008 | Spickard | |
| 2001/0006019 A1 | 7/2001 | Deininger et al. | |
| 2002/0157623 A1 * | 10/2002 | Turner et al. | 123/90.12 |
| 2004/0011411 A1 | 1/2004 | Thordarson et al. | |
| 2005/0000580 A1 * | 1/2005 | Tranovich et al. | 137/625.65 |
| 2005/0029484 A1 | 2/2005 | Belser | |
| 2005/0087244 A1 | 4/2005 | Delaney et al. | |
| 2006/0021664 A1 * | 2/2006 | Katsuta et al. | 137/625.65 |
| 2006/0065315 A1 * | 3/2006 | Neff et al. | 137/625.65 |
| 2006/0081288 A1 | 4/2006 | Jacobsen et al. | |
| 2006/0218928 A1 | 10/2006 | Spickard et al. | |
| 2006/0230770 A1 | 10/2006 | Kitsch | |
| 2006/0278285 A1 | 12/2006 | Shukhmin et al. | |
| 2007/0039573 A1 * | 2/2007 | Deierlein | 123/52.1 |
| 2008/0083892 A1 * | 4/2008 | Fenton | 251/68 |
| 2008/0245427 A1 * | 10/2008 | Williams et al. | 137/625.25 |
| 2009/0008586 A1 | 1/2009 | Abe et al. | |

OTHER PUBLICATIONS

Written Opinion of the Internatonal Searching Authority for Internatonal Application No. PCT/US2011/043298 mailed Dec. 27, 2011.

* cited by examiner

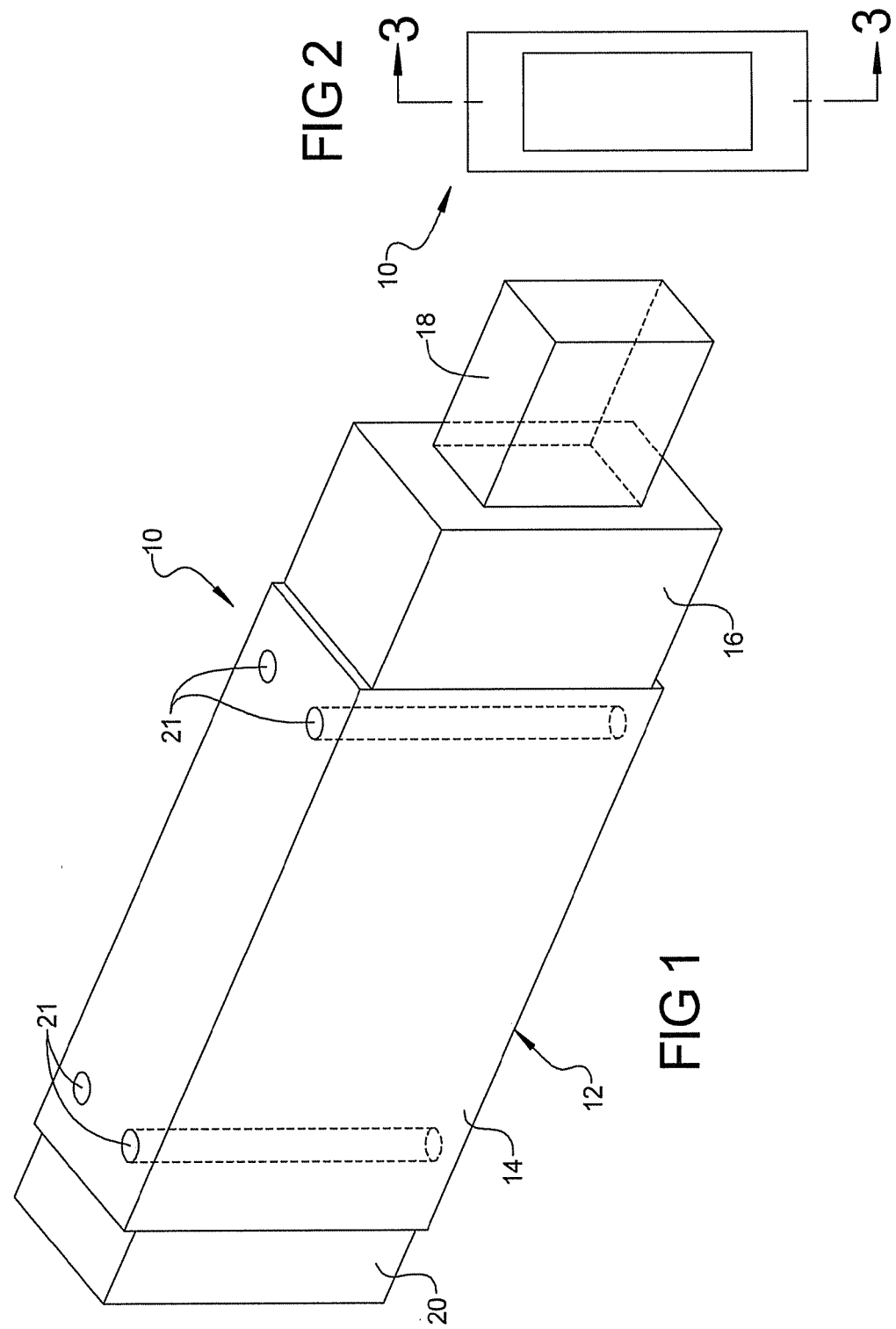

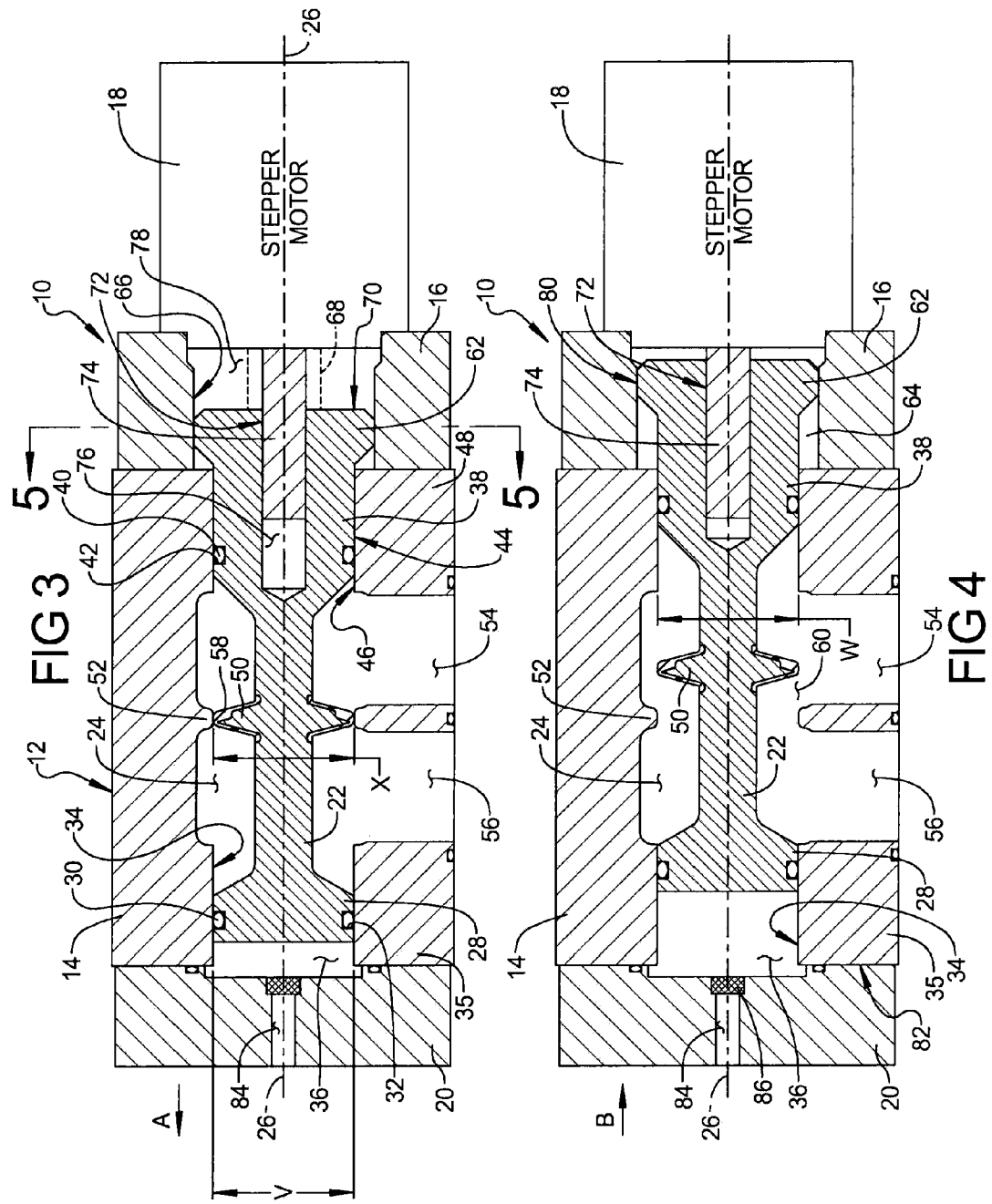

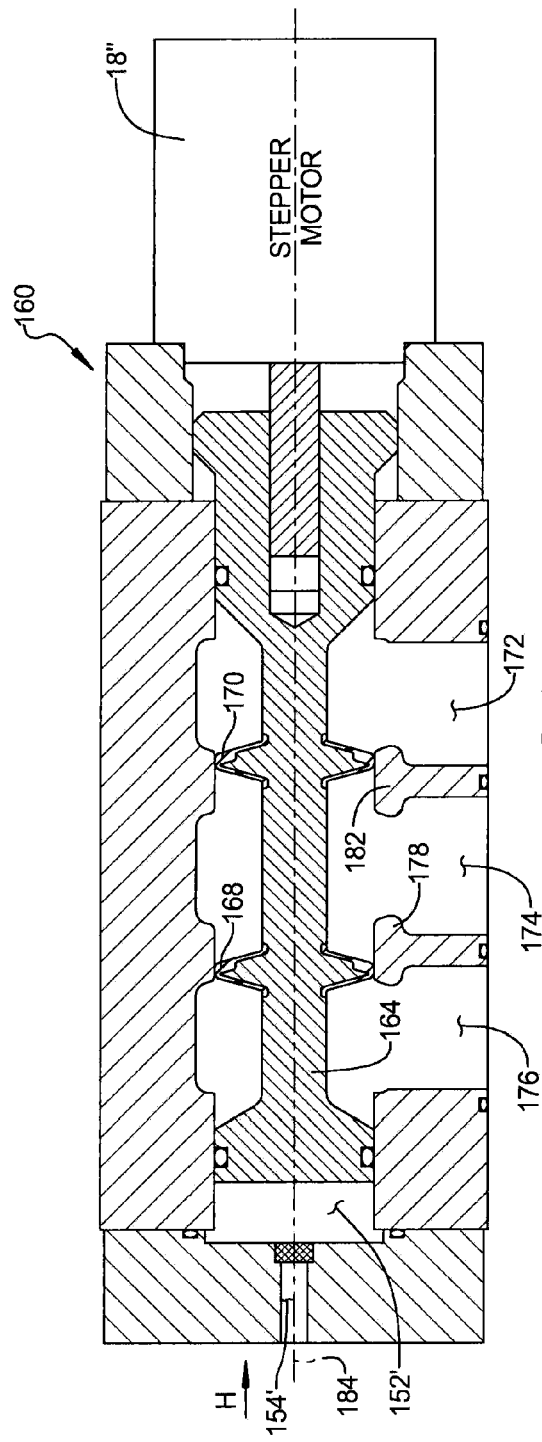
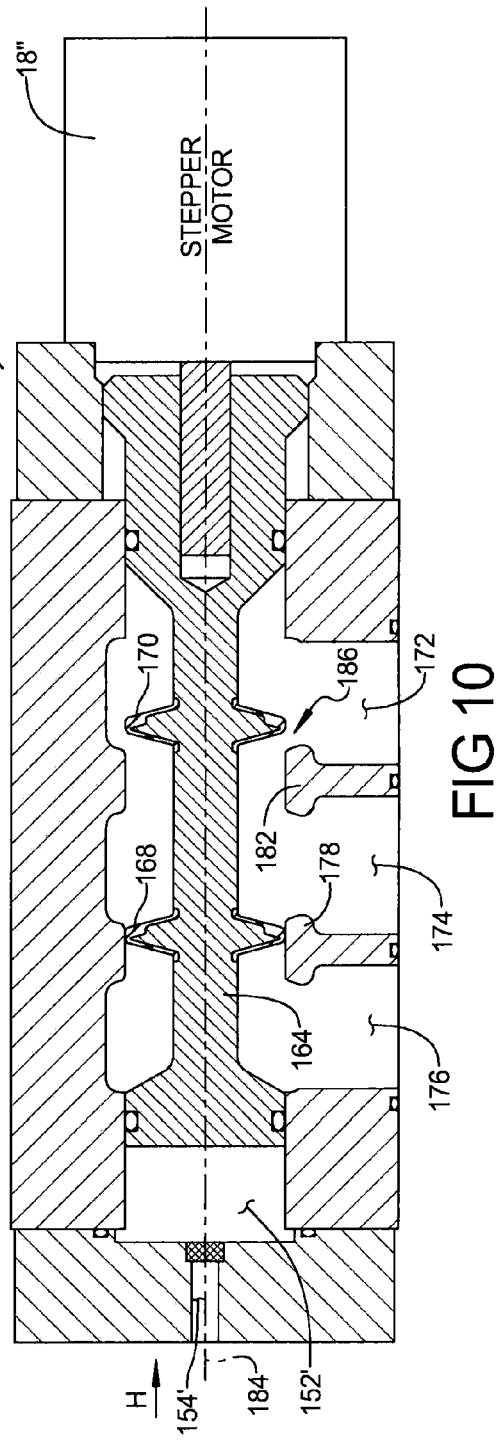

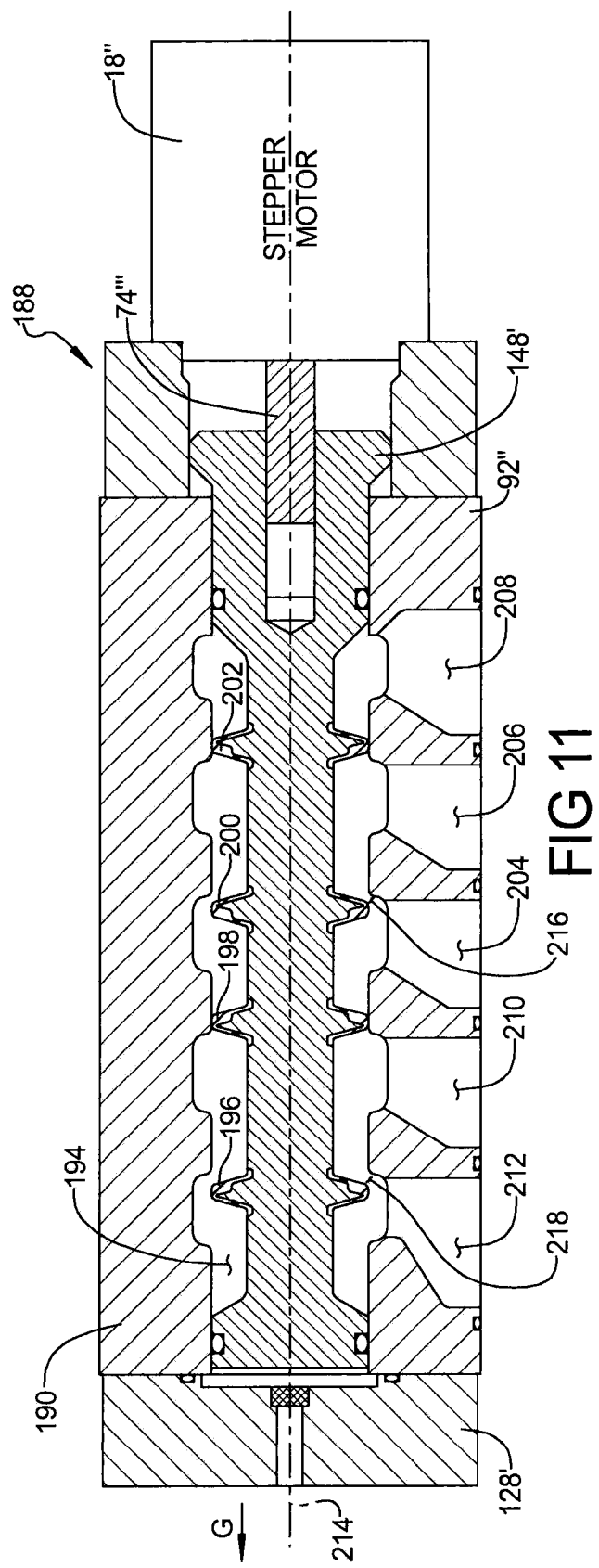

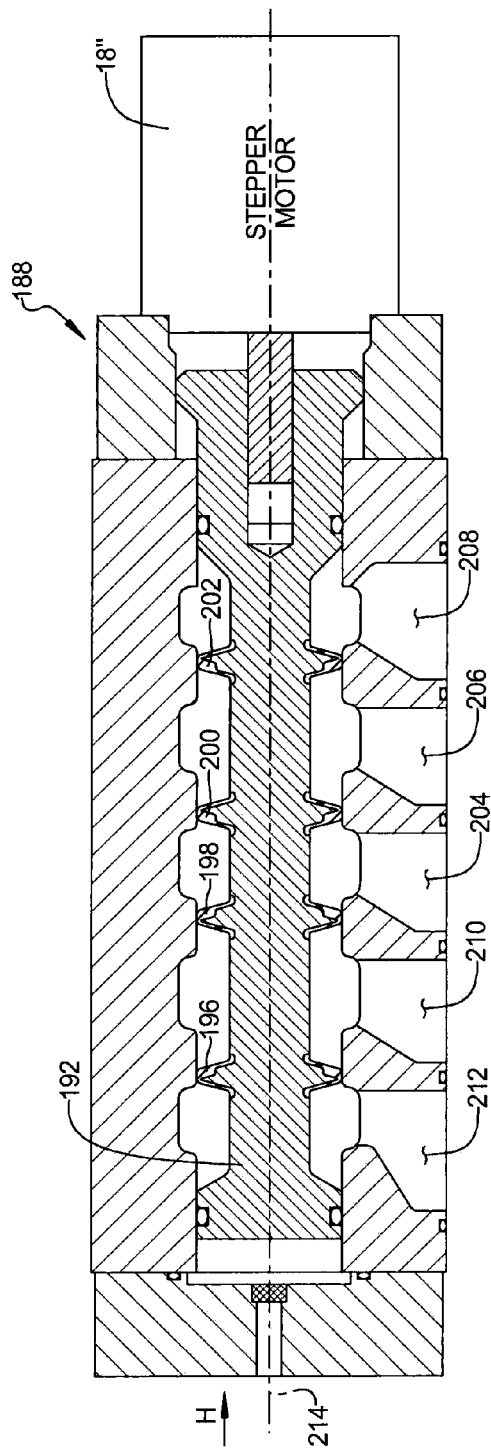
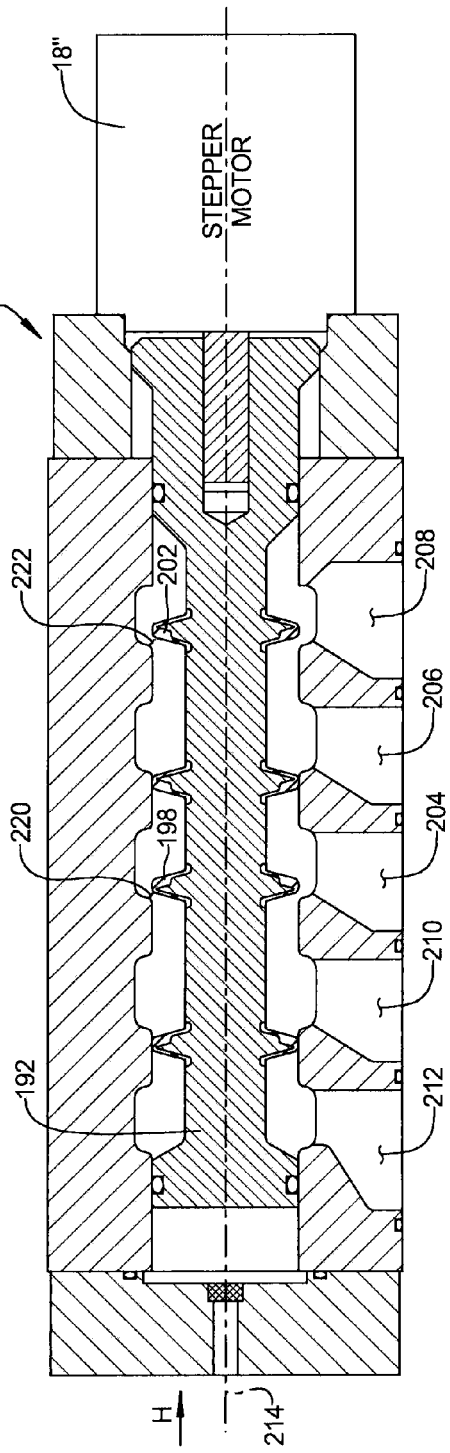

STEPPER MOTOR OPERATED BALANCED FLOW CONTROL VALVE

FIELD

The present disclosure relates to flow control valves operated by a stepper motor.

BACKGROUND

This section provides background information related to the present disclosure which is not necessarily prior art.

Flow control valves can be operated by a stepper motor to improve repeatability of valve member positions for valves requiring increased accuracy in controlling flow variability between a fully open and/or a fully closed position. Operations requiring an accurate delivery of a fluid volume or pressure to a working device can therefore benefit from the accuracy a stepper motor imparts compared to other known valve actuators. Known flow control valves operated by a stepper motor, however, commonly require a gear system or a multiple directional component drive system to change the rotational force of the stepper motor to a longitudinal force used to translate a valve member to open or closed valve positions. Common operating systems therefore lose operating force in order to drive the multiple parts. The complexity, power loss, and tolerance of the multiple moving parts of known systems also decrease position accuracy and repeatability of the valve position(s) that are beneficial reasons for using stepper motors for valve actuation.

SUMMARY

This section provides a general summary of the disclosure, and is not a comprehensive disclosure of its full scope or all of its features.

According to several embodiments, a flow control valve includes a body having a body bore oriented coaxially with a longitudinal axis of the body and a seat member extending into the bore. A valve member is slidably disposed in the bore and oriented coaxially with the longitudinal axis of the body. The valve member includes a non-circular geometrically shaped head having a bore. A drive adapter including a head receiving cavity slidingly receives the geometrically shaped head of the valve member while preventing axial rotation of the valve member. A stepper motor is connected to the drive adapter. The stepper motor operates to axially rotate a shaft directly engaged with the bore of the valve member.

According to other embodiments, a flow control valve includes a body having a body bore oriented coaxially with a longitudinal axis of the body. A valve member is slidably disposed in the bore and oriented coaxially with the longitudinal axis of the body. The valve member includes a non-circular geometrically shaped head having a bore; and at least one radial outwardly extending seat engagement member and first and second pistons. The first and second pistons have substantially equal diameters such that a pressurized fluid acting oppositely against the first and second pistons is balanced. A drive adapter includes a head receiving cavity slidingly receiving the geometrically shaped head of the valve member and preventing axial rotation of the valve member. A stepper motor is connected to the drive adapter. The stepper motor rotates a shaft directly engaged within the bore of the valve member to axially translate the valve member.

According to further embodiments, a flow control valve includes a body, having a body bore oriented coaxially with a longitudinal axis of the body, and first and second cylinder walls. A valve member is slidably disposed in the bore and oriented coaxially with the longitudinal axis of the body. The valve member includes a non-circular geometrically shaped head having a threaded bore coaxially aligned with the longitudinal axis. A first piston is positioned at an opposite end of the valve member from the geometrically shaped head. A second piston is positioned between the first piston and the geometrically shaped head. The first and second pistons seal against the cylinder walls of the body as the valve member slidably moves in the body bore. A drive adapter is connected to the body. The drive adapter includes a head receiving cavity slidingly receiving the geometrically shaped head of the valve member and preventing axial rotation of the valve member. A stepper motor is connected to the drive adapter. The stepper motor rotates a threaded shaft directly threadably engaged within the threaded bore of the valve member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front left perspective view of a flow control valve of the present disclosure;

FIG. 2 is an end elevational view of the flow control valve of FIG. 1;

FIG. 3 is a partial cross-sectional front elevational view taken at section 3 of FIG. 2;

FIG. 4 is the partial cross-sectional front elevational view of FIG. 3 further showing the flow control valve in a valve open position;

FIG. 9 is the partial cross-sectional front elevational view of FIG. 8 showing the flow control valve in a valve closed position;

FIG. 10 is the partial cross-sectional front elevational view of FIG. 8 showing the flow control valve in a valve open position;

FIG. 11 is a partial cross-sectional front elevational view of a 4-way flow control valve of the present disclosure having a spool valve member shown in a valve first open position;

FIG. 12 is the partial cross-sectional front elevational view of FIG. 11 showing the flow control valve in a valve closed position;

FIG. 13 is the partial cross-sectional front elevational view of FIG. 11 showing the flow control valve in a valve second open position.

DETAILED DESCRIPTION

Figure 5:
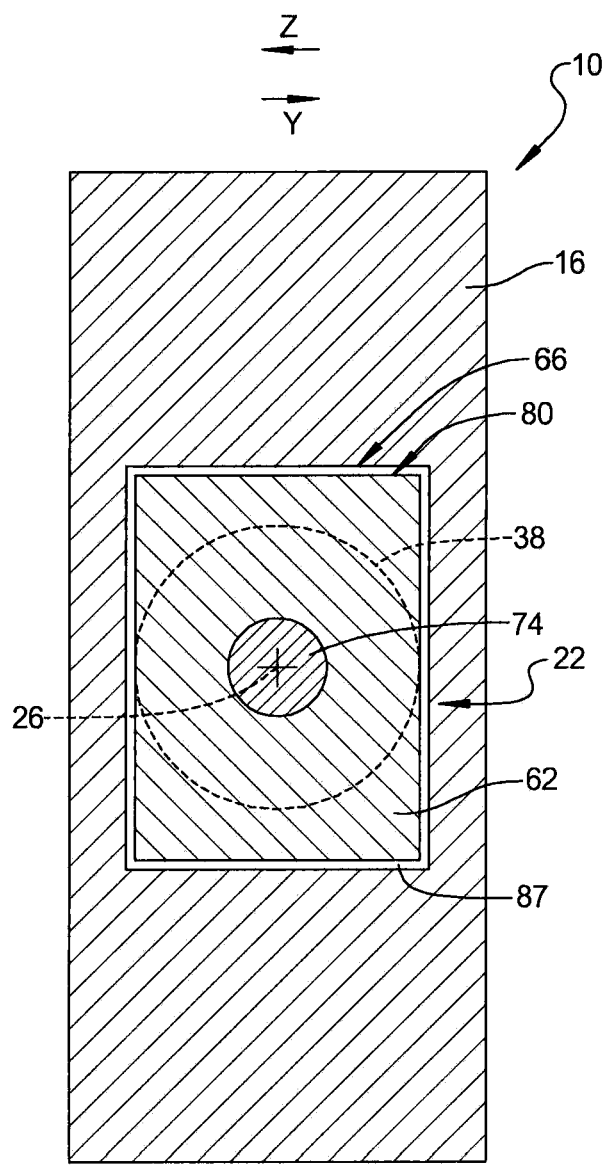
FIG. 5 is a cross-sectional end elevational view taken at section 5 of FIG. 3.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a flow control valve 10 includes a body assembly 12 having each of a main body portion 14, a drive adapter 16 which can be releasably connected to the main body portion 14, a valve actuator or operator in the form of a stepper motor 18 connected to the drive adapter 16, and an end cap 20 releasably connected to the main body portion 14 and oppositely positioned with respect to the stepper motor 18. According to further embodiments, drive adapter 16 can be an integral portion of main body portion 14. The main body portion 14 is represented as a block valve being substantially rectangular in shape allowing a plurality of the flow control valves 10 to be arranged in a side-by-side configuration, however, the disclosure is not limited to a specific valve body design. One or more through bores 21 can be provided in main body portion 14 to permit fastener mounting of flow control valve 10. Stepper motor 18 can be remotely energized from a power source (not shown).

Referring to FIG. 2, flow control valve 10 as previously noted can have a substantially rectangular shape wherein each of the main body portion 14, the drive adapter 16, and the stepper motor 18 can have substantially equal widths to control an overall width of flow control valve 10. A height of each of the components such as the main body portion 14, or the stepper motor 18 can vary as required.

Referring to FIGS. 3 and 4, further features of flow control valve 10 include a spool valve member 22 which is slidably disposed within a spool receiving bore 24 of main body portion 14. Spool valve member 22 is coaxially translatable on an assembly longitudinal axis 26 of body assembly 12. Spool valve member 22 includes a first piston 28 having a first resilient seal member 30 such as an O-ring or a D-ring positioned in a first seal slot 32 which provides a fluid seal between the first piston 28 and a first cylinder wall 34 internally created within main body portion 14. Spool valve member 22 is slidably positionable in each of first direction "A" and an opposite second direction "B" by the driving force of stepper motor 18.

Main body portion 14 further includes a first body end 35 having first cylinder wall 34 created therein. First piston 28 is slidably received in a first piston bore 36 of first body end 35 defined by first cylinder wall 34. Spool valve member 22 can also include a second piston 38 having a second resilient seal member 40 similar to first resilient seal member 30 positioned in a second seal slot 42. Second resilient seal member 40 provides a fluid pressure boundary between a second piston perimeter wall 44 and a second cylinder wall 46 created in a second body end 48 of main body portion 14. According to several embodiments, a diameter "V" of first piston 28 is substantially equal to a diameter "W" of second piston 38. Further, a diameter "X" of a seat engagement member 50 is substantially equal to diameters "V" and "W", so that the directional forces from a pressurized fluid in spool receiving bore 24 will "balance" or act equally and oppositely against equal exposed surface areas of first piston 28 and seat engagement member 50 in a valve closed position (shown in FIG. 3), and will balance against equal exposed surface areas of first and second pistons 28, 38 in a valve open position (shown in FIG. 4). Spool valve member 22 and further valve members of the present disclosure are therefore defined as pressure balanced designs.

Seat engagement member 50 is an outward radial extension of spool valve member 22. As shown in FIG. 3, spool valve member 22 can be positioned such that seat engagement member 50 contacts a seat member 52 of main body portion 14 in the valve closed position which isolates a pressurized fluid in an inlet port 54 from a first outlet port 56. According to several embodiments, seat engagement member 50 can be provided with a resilient material 58 over-molded onto seat engagement member 50. Resilient material 58 provides a glandular fluid seal when contacting seat member 52. When spool valve member 22 is moved in the second direction "B" (as shown in FIG. 4 after full motion), a flow passage 60 is created between seat engagement member 50 and resilient material 58 of seat member 52 permitting pressurized fluid flow from inlet port 54 to the first outlet port 56.

Because an outer perimeter of seat engagement member 50 (defined by resilient material 58) and each of the first and second pistons 28, 38 have substantially equal diameters, spool valve member 22 is pressure balanced in either the valve closed or valve opened positions. For example, in the valve closed position shown in FIG. 3 pressurized fluid acting against seat engagement member 50 in first direction "A" is equalized by the force of pressurized fluid acting on second piston 38 in second direction "B" so the net axial force acting on spool valve member 22 is substantially zero from the pressurized fluid. In the valve open position shown in FIG. 4, a pressure balanced condition is also present when fluid is flowing through a partially to fully open flow control valve 10. When flow passage 60 is open as shown in FIG. 4, a pressure differential exists between inlet port 54 and first outlet port 56, however, fluid pressure acting on first piston 28 in first direction "A" is substantially equal to the force of fluid pressure acting on a left hand side of seat engagement member 50, while fluid pressure acting on second piston 38 in second direction "B" is substantially equal to the force of fluid pressure acting on a right hand side of seat engagement member 50 such that the net axial force acting to translate spool valve member 22 is substantially zero.

Spool valve member 22 is coaxially translated with respect to assembly longitudinal axis 26 by a rotational force created by stepper motor 18. In order to convert the rotational force created by stepper motor 18 to a longitudinal or axial driving force, spool valve member 22 further includes a geometrically shaped head 62 positioned proximate to second piston 38 and at an opposite end of spool valve member 22 with respect to first piston 28. The term "geometrically shaped" head as defined herein refers to a geometric shape which is non-circular (i.e., cannot be completely circular). Shapes such as oval or a perimeter having at least one planar face and according to several embodiments multiple planar faces on the perimeter which can include triangular, rectangular, octagonal, and the like geometries can be used. According to several embodiments, geometrically shaped head 62 is substantially rectangular shaped which permits the spool valve member 22 to be created from rectangular shaped bar stock and machined or formed to provide the remaining features such as first and second pistons 28, 38 and seat engagement member 50.

Geometrically shaped head 62 is slidably received in a head receiving cavity 64 which can include a plurality of cavity faces 66 which mate with corresponding faces of geometrically shaped head 62. The non-circular geometry of geometrically shaped head 62 prevents axial rotation of spool valve member 22 with respect to assembly longitudinal axis 26 when driven by the rotational force of stepper motor 18. According to several embodiments, a biasing member 68 such as a compression spring can be received against an end face 70 of geometrically shaped head 62. An opposite end of biasing member 68 abuts stepper motor 18. Biasing member 68 applies a biasing force in the first direction "A" to spool valve member 22 to eliminate thread clearance between threads 72 of male threaded shaft 74 and a female threaded blind bore 76 created in second piston 38 so that spool valve member 22 can be repeatedly positioned to the open position by a predetermined number of rotations of stepper motor 18 which can vary with a pitch of threads 72.

A second head receiving cavity 78 is created between end face 70 of geometrically shaped head 62 and stepper motor 18. A volume of second head receiving cavity 78 varies as the spool valve member 22 translates in either of the first or second directions "A" or "B". A plurality of head faces 80 corresponding to a quantity of planar faces on the perimeter of geometrically shaped head 62 abut with individual ones of the cavity faces 66 to prevent axial rotation of spool valve member 22. Where non-planar faces are present on geometrically shaped head 62 such as when an oval shape is used, the shape of head receiving cavity 64 is shaped to match the perimeter shape of geometrically shaped head 62.

The male threaded shaft 74 can be directly or indirectly connected to and rotatably driven by stepper motor 18 and is directly threadably received in female threaded bore 76 coaxially aligned with respect to assembly longitudinal axis 26 in spool valve member 22. Rotation of male threaded shaft 74 therefore directly axially drives spool valve member 22 based on a quantity of complete or partial revolutions of male threaded shaft 74 which are predetermined to move between either of the valve open or valve closed positions. Spool valve member 22 axial position is repeatable based in part on the limited slip between the threads of male threaded shaft 74 and female threaded bore 76. Biasing member 68 further biases the spool valve member 22 to mitigate axial dimensional changes resulting from thread clearances and/or wear. In addition, the previously described pressure balanced design of spool valve member 22 substantially eliminates a net-axial-force acting on spool valve member 22 due to the pressurized fluid in any of the operating positions of flow control valve 10 to further enhance the repeatability of the position of spool valve member 22.

Main body portion 14 further includes a body end face 82 which is substantially planar and releasably receives the end cap 20, for example using fasteners (not shown). To vent fluid present in first piston bore 36 as first piston 28 axially translates, first piston bore 36 is in fluid communication with an end cap passage 84. End cap passage 84 can include a filter 86 to prevent influx of contaminants such as dirt or water into passage 24. Fluid such as air can thereby be drawn in or exhausted to equalize the fluid pressure in first piston bore 36 with atmospheric pressure for any axial position of spool valve member 22.

Referring to FIG. 5, and as previously noted, geometrically shaped head 62 can be provided having a rectangular shape. The cavity faces 66 each correspond to one of the head faces 80 with a clearance gap 87 provided about a perimeter of geometrically shaped head 62. It should be evident from the geometry of geometrically shaped head 62 is shown in FIG. 5 that axial rotation of male threaded shaft 74 with respect to assembly longitudinal axis 26 will not similarly rotate geometrically shaped head 62 or spool valve member 22. Clearance gap 87 can further be sized to permit fluid transfer about a perimeter of geometrically shaped head 62 as spool valve member 22 translates so that fluid pressure is substantially equalized in each of head receiving cavity 64 and second head receiving cavity 78 shown and described in reference to FIGS. 3 and 4.

In the configuration shown in FIG. 5 and referring again to FIGS. 3 and 4, use of a right-handed thread on male threaded shaft 74 together with a clockwise first direction of rotation of male threaded shaft 74 by stepper motor 18 in a direction of rotation "Y" will pull spool valve member 22 toward the viewer as viewed in FIG. 5 and in the first direction "A" as shown in FIG. 3. An opposite or counterclockwise second direction of rotation of male threaded shaft 74 by stepper motor 18 in a direction of rotation "Z" will push spool valve member 22 away from the viewer as viewed in FIG. 5 and in the second direction "B" as shown in FIG. 4. It should be evident that use of a left-handed thread on male threaded shaft 74 (and for female threaded bore 76) can produce opposite directions of spool travel.

Referring to FIG. 6 and again to FIGS. 3 and 4, according to other embodiments a flow control valve 88 using the drive features of the present disclosure can also be used for operating a poppet valve. Flow control valve 88 can include a valve body 90 having a drive adapter 92 similar to drive adapter 16 releasably connected thereto. Stepper motor 18' is similarly connected to drive adapter 92 having a male threaded shaft 74' axially extending therefrom. A poppet valve member 94 is slidably disposed on a longitudinal axis 96 of valve body 90. Poppet valve member 94 includes a first piston 98 slidably disposed and sealingly received in a first piston cavity 100 of valve body 90. Poppet valve member 94 can include an "overmolded" seat engagement member 102 having for example a material such as rubber or a polymeric resilient material overmolded (i.e., molded onto and extending outwardly from) the poppet valve member 94. Overmolded seat engagement member 102 sealingly contacts a valve member seat ring 104 in a valve closed position shown. In the valve closed position an inlet port 106 is isolated from an outlet port 108 to prevent fluid flow through flow control valve 88.

Figure 6:
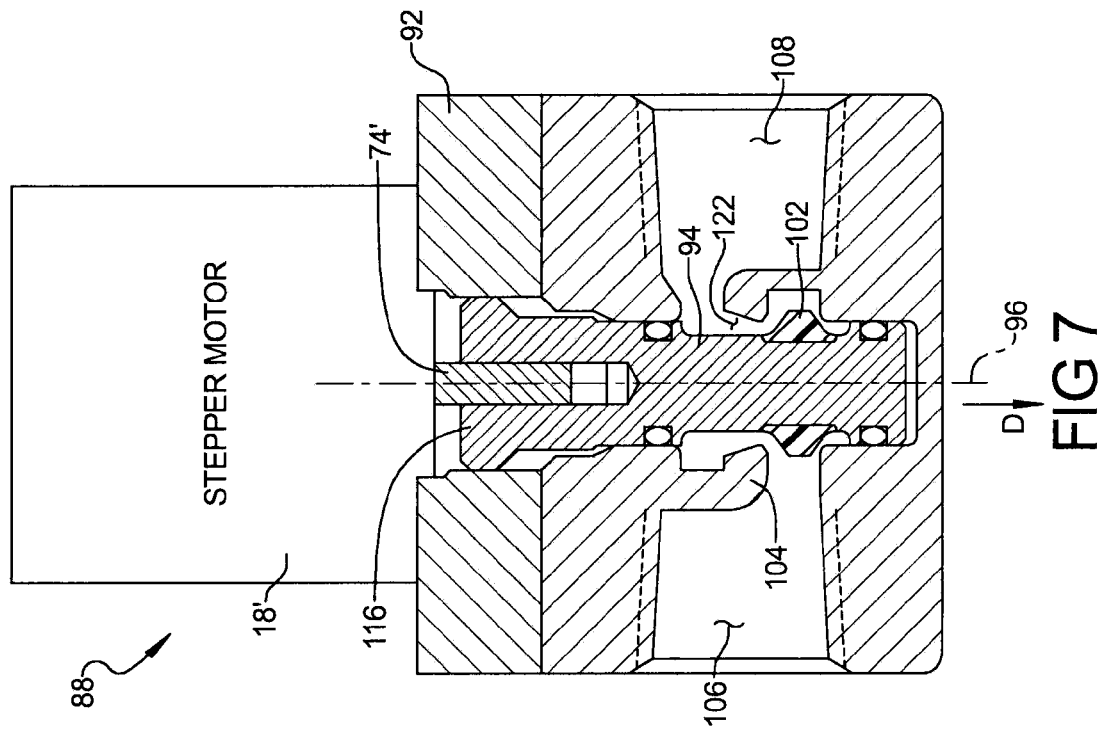
FIG. 6 is a partial cross-sectional front elevational view of another embodiment of a flow control valve of the present disclosure having a poppet valve member shown in a valve closed position.
Figure 7:
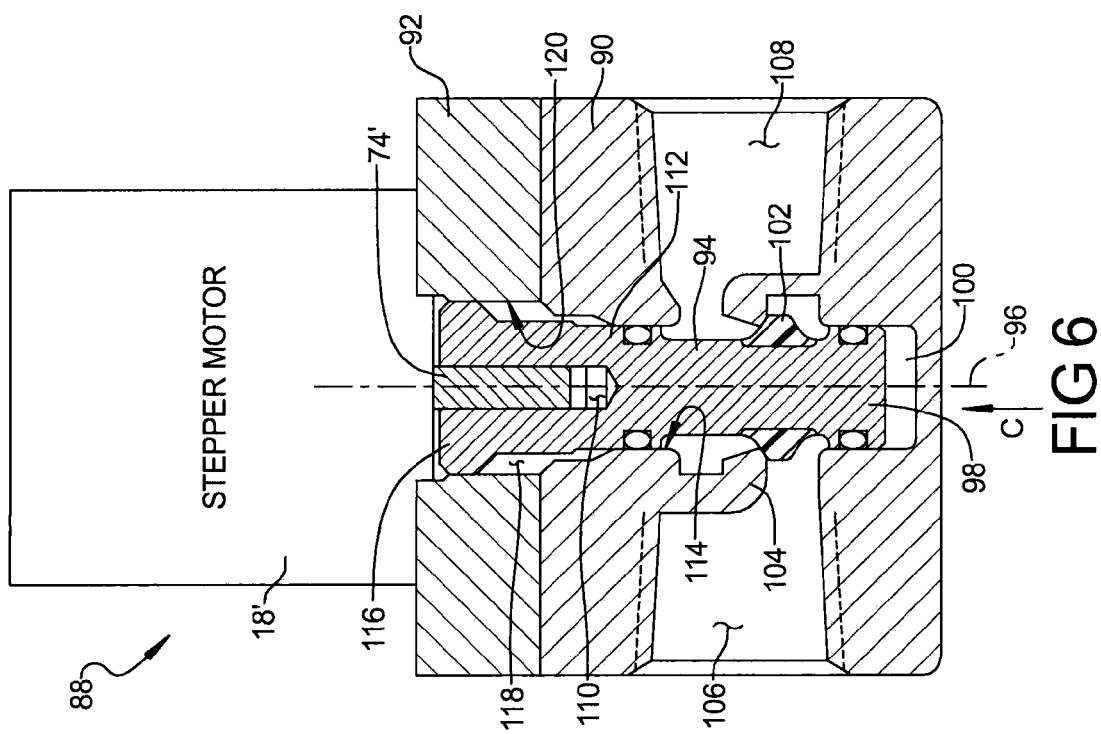
FIG. 7 is the partial cross-sectional front elevational view of FIG. 6, further showing the poppet valve member in a valve open position.

Referring to FIGS. 6 and 7, poppet valve member 94 further includes a female threaded bore 110 threadably receiving the male threaded shaft 74' of stepper motor 18'. Rotation of stepper motor or of 18' therefore operates similar to the operation of stepper motor 18 described in reference to FIGS. 3 and 4 above, to axially displace poppet valve member 94 in a valve closing direction "C" to reach the valve closed position. Poppet valve member 94 further includes a second piston 112 which has a diameter substantially equal to a diameter of first piston 98. In the valve closed position shown in FIG. 6 pressurized fluid acting against seat engagement member 102 in closing direction "C" is equalized by the force of pressurized fluid acting on first piston 98 in a valve opening direction "D" so the net axial force acting on poppet valve member 94 is substantially zero from the pressurized fluid.

Second piston 112 is slidably disposed with respect to a second cylinder wall 114 of valve body 90. A geometrically shaped head 116 is created on an end of poppet valve member 94 oppositely positioned with respect to first piston 98. Geometrically shaped head 116 is slidably received in a head receiving cavity 118 which can include a plurality of cavity faces 120 corresponding to the geometric shaped planar faces (or non-planar geometry) of geometrically shaped head 116. Geometrically shaped head 116 in contact with the plurality of cavity faces 120 therefore prevents rotation of poppet valve member 94 during axial translation of poppet valve member 94. For the same reasons previously noted with respect to the embodiment of FIGS. 3 and 4, geometrically shaped head 116 can also be oval shaped, or include a single or multiple planar surfaces on its perimeter to prevent axial rotation of poppet valve member 94.

Referring more specifically to FIG. 7, a valve open position of fluid control valve 88 is provided when stepper motor 18' is rotated in an opposite axial rotation direction compared to the rotation to achieve the closed position shown in reference to FIG. 6. As poppet valve member 94 axially displaces in valve opening direction "D" and overmolded seat engagement member 102 displaces from valve member seat ring 104, a flow passage 122 is created which permits flow from inlet port 106 to outlet port 108. Because first and second pistons 98, 112 of poppet valve member 94 have substantially equivalent diameters, the pressure forces acting on poppet valve member 94 are balanced when the flow control valve 88 is in a partially to fully open flow control valve 88 as follows. In the valve open position, flow passage 122 is open and a pressure differential exists between inlet port 106 and outlet port 108, however, fluid pressure acting on first piston 98 in opening direction "D" is substantially equal to the force of fluid pressure acting on a downward facing side of seat engagement member 102 (directed in closing direction "C"), while fluid pressure acting on second piston 112 in closing direction "C" is substantially equal to the force of fluid pressure acting on an upward facing side of seat engagement member 102 (directed in opening direction "D") such that the net axial force acting to translate spool valve member 94 is substantially zero. This pressure balance reduces the amount of force required by stepper motor 18' to return the valve to a valve closed position and also when the valve is positioned in the closed and/or in any partially open position.

Figure 8:
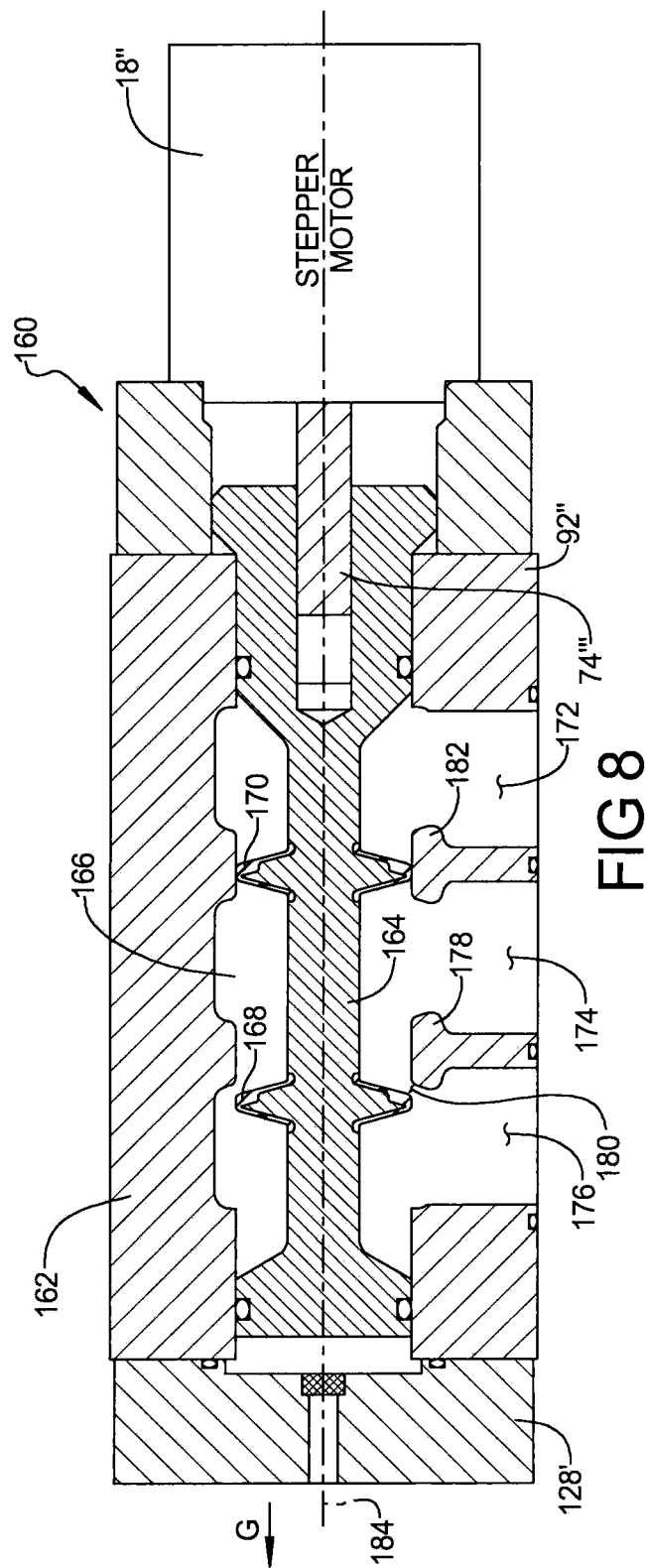
FIG. 8 is a partial cross-sectional front elevational view of a 3-way flow control valve of the present disclosure having a spool valve member shown in a fully exhausted position.

Referring to FIG. 8, according to other embodiments a flow control valve 160 includes a 3-way valve body 162 modified from the flow control valve 124 shown and described with reference to FIGS. 3 and 4 to include additional overmolded seat engagement members and seat members, therefore only the differences will be further described herein. A spool valve member 164 is slidably disposed in a spool receiving bore 166 and includes a first overmolded seat engagement member 168 and a second overmolded seat engagement member 170. In an exhaust position of flow control valve 160 an inlet port 172 is closed to an outlet port 174 and an exhaust port 176. Outlet port 174 is open to exhaust port 176. The first overmolded seat engagement member 168 is displaced from a first seat member 178 thereby creating a first flow passage 180 for fluid communication between outlet port 174 and exhaust port 176. Second overmolded seat engagement member 170 contacts a second seat member 182 in the fully exhausted position. Spool valve member 164 is fully displaced in a first direction "G" to achieve the exhaust position by rotation of a male threaded shaft 76''' using stepper motor 18''.

Referring to FIG. 9 and again to FIG. 8, a closed position of flow control valve 160 is created by translation of spool valve member 164 in a second direction "H" opposite to first direction "G" until first and second overmolded seat engagement members 168, 170 contact first seat member 178 and second seat member 182 respectively. In the valve closed position the inlet port 172, the outlet port 174, and the exhaust port 176 are closed to each other having no common flow paths therebetween. As spool valve member 164 translates in the second direction "H", air is drawn into vent aperture 154' to equalize atmospheric pressure in first piston bore 152'.

Referring to FIG. 10, an open position of flow control valve 160 is created by further translation of spool valve member 164 from the closed position in the second direction "H" until second overmolded seat engagement member 170 displaces with respect to second seat member 182, thereby creating a second flow passage 186. Second flow passage 186 provides fluid communication between inlet port 172 and outlet port 174 while exhaust port 176 is closed to both inlet port 172 and outlet port 174 by contact between first overmolded seat engagement member 168 and first seat member 178. For the same reasons previously discussed herein, spool valve member 164 is a pressure balanced design so that fluid pressure forces acting on spool valve member 164 are balanced in all operating positions of flow control valve 160.

Referring to FIG. 11, a flow control valve 188 is modified from flow control valve 160 shown and described in reference to FIGS. 8-10 by the addition of further valve ports and spool valve seat members. Flow control valve 188 includes a 4-way valve body 190 having a spool valve member 192 slidably positioned within a spool receiving bore 194 of 4-way valve body 190. The spool valve member 192 includes a first, second, third, and fourth overmolded seat engagement member 196, 198, 200, and 202. 4-way valve body 190 further includes each of an inlet port 204, a first outlet port 206, a first exhaust port 208, a second outlet port 210, and a second exhaust port 212. The spool valve member 192 is slidably disposed on a longitudinal axis 214.

In a first open position of flow control valve 188, spool valve member 192 is slidably disposed in the first direction "G" to a maximum extent by operating stepper motor 18'' to rotate male threaded shaft 74'''. Axial rotation of spool valve member 192 is precluded by the geometric shape of drive adapter 92'' which non-rotatably receives geometrically shaped head 148'. In the first open position, inlet port 204 is in open to first outlet port 206 and both are closed to first exhaust port 208. A first flow passage 216 is created proximate to third overmolded seat engagement member 200 to permit fluid flow from inlet port 204 through first outlet port 206. Also in the first open position of flow control valve 188, a first exhaust passage 218 is created by displacement of first overmolded seat engagement member 196 while second overmolded seat engagement member 198 is retained in a sealing condition. First exhaust passage 218 provides for fluid communication between second outlet port 210 and second exhaust port 212, while inlet port 204 is closed to both second outlet port 210 and second exhaust port 212.

Referring to FIG. 12 and again to FIG. 11, a closed position of flow control valve 188 is created by translating spool valve member 192 in a second direction "H", which is opposite to the first direction "G", until all of the first, second, third, and fourth overmolded seat engagement members 196, 198, 200, 202 are positioned in seated and sealed conditions. In the closed position of flow control valve 188, all of the individual ports are closed to each other preventing any discharge flow of fluid from inlet port 204 to any of the outlet ports.

Referring to FIG. 13, a second open position of flow control valve 188 is created by further axial translation of spool valve member 192 in the second direction "H" until second overmolded seat engagement member 198 and fourth overmolded seat engagement member 202 are displaced from their seated positions. A second flow passage 220 created proximate to second overmolded seat engagement member 198 provides for fluid communication between inlet port 204 and second outlet port 210. Second exhaust port 212 is closed to both inlet port 204 and second outlet port 210 in the second open position. Also in the second open position, a second exhaust passage 222 is created proximate to fourth overmolded seat engagement member 202. Second exhaust passage 222 provides for fluid communication between first outlet port 206 and first exhaust port 208 while fluid pressure in inlet port 204 is closed to both first outlet port 206 and first exhaust port 208. For the same reasons previously described herein, spool valve member 192 provides a pressure balanced design such that fluid pressure forces acting on the spool valve member 192 are balanced in all operating positions of flow control valve 188.

Figure 14:
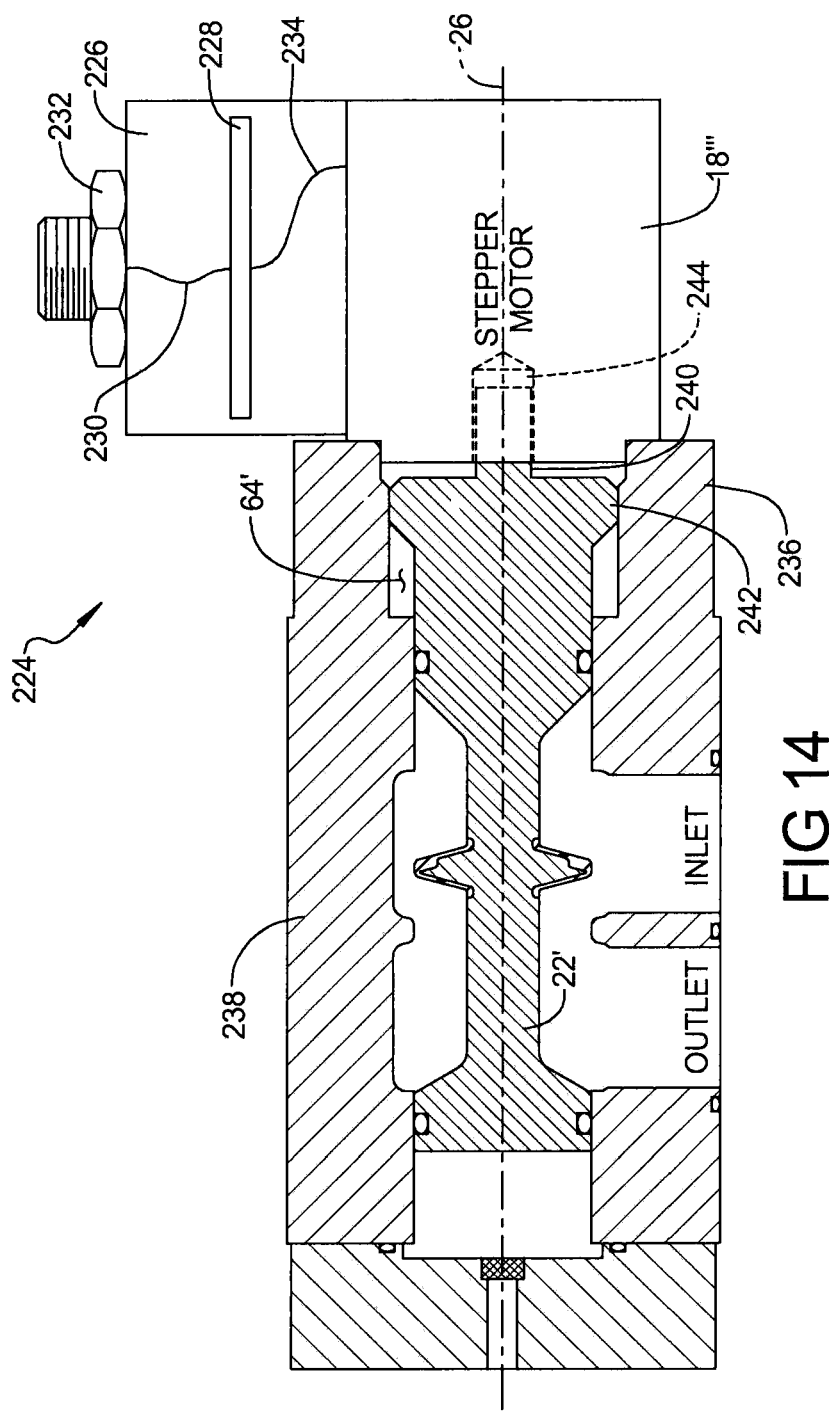
FIG. 14 is a partial cross-sectional front elevational view similar to FIG. 3 further showing an additional embodiment having an electronic interface device and housing.

Referring to FIG. 14, a flow control valve 224 includes an electronic interface housing 226 having an electronic interface device 228 which receives an operating command signal such as an analog or a digital signal, or a voltage or current via a control line 230. Control line 230 is connected through an electrical connector 232 which seals electronic interface housing 226 from the atmosphere and provides for connection to an electrical power source for operation of flow control valve 224. The command signal received by electronic interface device 228 is converted as necessary to an output required for operation of stepper motor 18''' and transmitted via a second control line 234 to stepper motor 18''' to cause rotation of stepper motor 18''' and thereby axial translation of spool valve member 22'. A drive adapter 236 in flow control valve 224 is an integral portion of a main body portion 238. A male threaded extension 240 extends away from a geometrically shaped head 242 of spool valve member 22'. Extension 240 can be an integral portion of geometrically shaped head 242, or can be a male threaded fastener threadably coupled to geometrically shaped head 242. Extension 240 is threadably received in a bore 244 of stepper motor 18''' which can be a female threaded bore. Rotation of stepper motor 18''' co-rotates the motor portion containing bore 244 which threadably engages extension 240 to axially translate spool valve member 22'.

Each of the flow control valves of the present disclosure provide variable flow control by incremental rotation of a stepper motor. Incremental rotation of the stepper motor is translated into an axial translation of a valve member. Also, as the valve member moves toward an open position, a pressure drop is created across the valve ports. Because the bore in which the valve member is slidably received has equal diameters at the contact points of the valve member and valve body, each port section balances forces acting on the valve member.

Flow control valves of the present disclosure offer several advantages. By providing pressure balanced poppet or spool designs for all the flow control valve embodiments, fluid pressure forces acting on the spool or poppet do not increase the operating force required from the stepper motors of the present disclosure. The stepper motors therefore only have to overcome static friction and sliding friction forces during translation of the poppet or spool valve members. The geometrically shaped heads provided with each of the poppets or spool valve members of the present disclosure preclude rotation of the poppet or spool valve members allowing the rotational force of the stepper motor to be directly translated to the poppet or spool valve member by a male threaded engagement shaft extending from the stepper motor which is directly threadably received in a female threaded bore of the valve member. The male threaded shaft and the geometrically shaped head are positioned in an adaptor member positioned between the valve body and the stepper motor. This design eliminates additional clutch members, key members, anti-rotational fasteners, and the like to prevent rotation of the poppet or spool member during translation.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A flow control valve, comprising:
   a body of rectangular shape having four longitudinal faces extending parallel to a longitudinal axis of the body, the body defining a body bore oriented coaxially with the longitudinal axis of the body and a seat member extending into the body bore, the body bore having a bore diameter;
   an end cap in contact with the body having an end cap passage through the end cap that is disposed in fluid communication with the body bore to vent the body bore;
   a valve member slidably disposed in the body bore and oriented coaxially with the longitudinal axis of the body, the valve member including:
      a rectangular shaped head presenting four head faces;
      a cylinder shaped spool valve member extending integrally from the rectangular shaped head such that the rectangular shaped head and the cylinder shaped spool valve member are integrally connected with one another as part of the valve member, the cylinder shaped spool valve member having a resilient seal member slidably and sealingly engaging the bore diameter of the body bore to create a close tolerance fit with the bore diameter during sliding motion of the valve member in the body bore; and
      a threaded bore formed through both the rectangular shaped head and the cylinder shaped spool valve member;
   a drive adapter including a rectangular shaped head receiving cavity slidingly receives the rectangular shaped head of the valve member while preventing axial rotation of the valve member, the head receiving cavity further providing a clearance gap about an entire perimeter of the rectangular shaped head, with fluid in the body bore prevented from entering the clearance gap or the head receiving cavity by the seal member;
   a stepper motor connected to the drive adapter, the stepper motor operating to axially rotate a shaft directly engaged with the valve member to axially displace the valve member;
   an inlet port extending through the body from the body bore to one of the longitudinal faces of the body to define a ported longitudinal face of the body wherein the inlet port is open to the ported longitudinal face and is closed to the other longitudinal faces of the body;
   an outlet port disposed in side-by-side relationship with the inlet port, the outlet port extending through the body from the body bore to the ported longitudinal face of the body wherein the outlet port is open to the ported longitudinal face and is closed to the other longitudinal faces of the body; and
   wherein the cylinder shaped spool valve member has a diameter that creates a close tolerance fit with the bore diameter and wherein the valve member tapers from the rectangular shaped head to the cylinder shaped spool valve member such that the rectangular shaped head of the valve member has a predetermined width that is greater than the diameter of the cylinder shaped spool valve member.

2. The flow control valve of claim 1, wherein the rectangular shaped head includes at least one planar head face.

3. The flow control valve of claim 2, wherein the head receiving cavity includes four cavity faces that abut the four head faces of the rectangular shaped head to prevent axial rotation of the valve member.

4. The flow control valve of claim 1, wherein the valve member further includes at least one seat engagement member outwardly radially extending from the valve member sealingly engaging with the seat member defining a closed position of the flow control valve.

5. The flow control valve of claim 4, wherein rotation of the shaft in a first direction operates to longitudinally displace the valve member in the body bore from the closed position to an open position of the flow control valve, and rotation of the shaft in an opposite second direction operates to return the valve member from the open position to the valve closed position.

6. The flow control valve of claim 1, wherein the valve member further includes:
   a first piston positioned at an opposite end of the valve member from the rectangular shaped head; and
   a second piston defining the cylinder shaped spool valve member positioned between the first piston and the rectangular shaped head, the first and second pistons operating to seal against cylinder walls of the body as the valve member slidably moves in the body bore.

7. The flow control valve of claim 6, wherein the first and second pistons have substantially equal diameters such that a pressurized fluid acting oppositely against the first and second pistons results in balanced pressure forces acting on the valve member.

8. The flow control valve of claim 1, further comprising an electronic interface device receiving a command signal and converted by the electronic interface device to an output for operation of stepper motor.

9. The flow control valve of claim 8, further including an electronic interface housing having the electronic interface device disposed therein and an electrical connector sealing the electronic interface housing from the atmosphere and providing electrical connection for the flow control valve.

10. The flow control valve of claim 1, wherein the valve member is slidably received in the body.

11. The flow control valve of claim 1, wherein the threaded bore threadably receives the shaft, the shaft being a male threaded shaft connected to and extending from the stepper motor, such that incremental rotation of the stepper motor rotates the male threaded shaft which threadably engages the threaded bore to incrementally axially translate the valve member.

12. The flow control valve of claim 1, wherein the rectangular shaped head has the shaft integrally connected to and extending away therefrom, the shaft being a male threaded shaft further threadably engaged within a female threaded bore of the stepper motor such that incremental rotation of the stepper motor and female threaded bore threadably engages the shaft to incrementally axially translate the valve member.

13. The flow control valve of claim 1, wherein the drive adapter is releasably connected to the body.

14. The flow control valve of claim 1, wherein the drive adapter is integrally connected to the body and the rectangular shaped head of the valve member is slidably received in the head receiving cavity having four cavity faces mating with the four head faces of the rectangular shaped head preventing axial rotation of the valve member.

15. The flow control valve of claim 1, wherein the valve member defines a spool valve member.

16. The flow control valve of claim 1, wherein the valve member defines a poppet valve member.

17. A flow control valve, comprising:
a body having a body bore oriented coaxially with a longitudinal axis of the body and an end cap in contact with the body having an end cap passage through the end cap in communication with the body bore to vent the body bore, the body bore having a bore diameter;
a valve member slidably disposed in the body bore and oriented coaxially with the longitudinal axis of the body, the valve member including:
  a rectangular shaped head and a cylindrical shaped body portion that are integrally connected with one another as part of the valve member, both the rectangular shaped head and the cylindrical shaped body having a threaded bore created therein; and
  at least one radial outwardly extending seat engagement member and first and second pistons that are integrally connected with one another as part of the valve member, the first and second pistons having substantially equal diameters that create a close tolerance fit with the bore diameter such that a pressurized fluid acting oppositely against the first and second pistons is balanced;
a drive adapter including a head receiving cavity slidingly receiving the rectangular shaped head of the valve member and preventing axial rotation of the valve member;
a stepper motor connected to the drive adapter, the stepper motor rotating a shaft directly engaged within the threaded bore of the valve member to axially translate the valve member;
the flow control valve having a substantially rectangular shape wherein each of the body, the end cap, the drive adapter and the stepper motor have substantially equal widths defining an overall width of the flow control valve; and
the cylindrical shaped body portion of the valve member having a diameter that creates a close tolerance fit with the bore diameter wherein the valve member tapers from the rectangular shaped head to the cylindrical shaped body portion such that the rectangular shaped head of the valve member has a predetermined width that is greater than the diameter of the cylindrical shaped body portion.

18. The flow control valve of claim 17, wherein the at least one radial outwardly extending seat engagement member comprises first and second seat engagement members each having a diameter equal to the diameters of the first and second pistons and the diameter of the cylindrical shaped body portion of the valve member.

19. The flow control valve of claim 18, wherein the body is a 3-way valve body including:
first and second seat members extending into the body bore; and
an inlet port longitudinally positioned between the drive adapter and the second seat member, an outlet port longitudinally positioned between the first and second seat members, and an exhaust port longitudinally positioned between the end cap and the first seat member.

20. The flow control valve of claim 19,
wherein in a valve open position the first seat engagement member contacts the first seat member and the second seat engagement member is displaced from the second seat member having the inlet port in communication with the outlet port and both the inlet port and the outlet port isolated from the exhaust port; and
wherein in a valve closed position the first seat engagement member contacts the first seat member and the second seat engagement member contacts the second seat member having the inlet, outlet, and the exhaust ports isolated from each other.

21. The flow control valve of claim 19, wherein the first seat engagement member is displaced from the first seat member and the second seat engagement member contacts the second seat member defining an exhaust position having the outlet port in communication with the exhaust port and the inlet port isolated from both the outlet port and the exhaust port.

22. The flow control valve of claim 18, wherein the at least one radial outwardly extending seat engagement member comprises first, second, third, and fourth seat engagement members each having a diameter equal to the diameters of the first and second pistons.

23. The flow control valve of claim 18, wherein the body is a 4-way valve body including:
a plurality of seat members extending into the body bore individually positioned to be contacted by one of the seat engagement members; and
an inlet port, first and second outlet ports, and first and second exhaust ports.

24. The flow control valve of claim 17, wherein the body is a 2-way valve body including:
a seat member extending into the body bore; and
an inlet port and an outlet port, the at least one radial outwardly extending seat engagement member contacting the seat member in a valve closed position isolating the inlet port from the outlet port.

25. A flow control valve, comprising:
a body having at least one longitudinal face extending parallel to a longitudinal axis of the body, the body defining first and second cylinder walls and a body bore oriented coaxially with the longitudinal axis of the body;
a valve member slidably disposed in the body bore and oriented coaxially with the longitudinal axis of the body, the valve member including:
  a non-circular geometrically shaped head having a threaded bore coaxially aligned with the longitudinal axis extending through the non-circular geometrically shaped head;
  a first piston positioned at an opposite end of the valve member from the non-circular geometrically shaped head; and
  a second piston positioned between the first piston and the non-circular geometrically shaped head and integrally connected to the non-circular geometrically shaped head, having the threaded bore extending into the second piston, the first and second pistons seal against the cylinder walls of the body as the valve member slidably moves in the body bore;
a drive adapter connected to the body, the drive adapter including a head receiving cavity slidingly receiving the non-circular geometrically shaped head of the valve member and preventing axial rotation of the valve member;
a stepper motor connected to the drive adapter, the stepper motor rotating a threaded shaft directly threadably engaged within the threaded bore of the valve member;
a first seat member defined by the body extending between the at least one longitudinal face of the body and the body bore, the first seat member having an outer edge disposed furthest from the drive adapter and a centerline that laterally bi-sects the first seat member;
a second seat member defined by the body extending between the at least one longitudinal face of the body and the body bore, the second seat member having an outer edge disposed nearest to the drive adapter and a center-line that laterally bi-sects the second seat member;

an inlet port extending through the body from the body bore to the at least one longitudinal face of the body that is longitudinally positioned between the drive adapter and the second seat member;

an outlet port extending through the body from the body bore to the at least one longitudinal face of the body that is longitudinally positioned between the first seat member and second seat member;

an exhaust port extending through the body from the body bore to the at least one longitudinal face of the body that is longitudinally positioned between the end cap and the first seat member;

the first and second seat members defining an outer spacing equal to the distance between the outer edges of the first and second seat members and a center-line spacing equal to the distance between the center-lines of the first and second seat members; and the valve body further including a first seat engagement member and a second seat engagement member extending from the valve body that are longitudinally spaced from one another by a set distance that is less than the outer spacing of the first and second seat members and greater than the center-line spacing of the first and second seat members such that the valve body may be moved to one of:

a valve open position where the first seat engagement member contacts the first seat member and the second seat engagement member is displaced from the second seat member to permit fluid communication between the inlet port and the outlet port and to isolate both the inlet port and the outlet port from the exhaust port;

a valve closed position where the first seat engagement member contacts the first seat member and the second seat engagement member contacts the second seat member to isolate the inlet port and the outlet port and the exhaust port from one another; and an exhaust position where the first seat engagement member is displaced from the first seat member and the second seat engagement member contacts the second seat member to permit fluid communication between the outlet port and the exhaust port and isolate both the outlet port and the exhaust port from the inlet port.

26. The flow control valve of claim 25, further comprising:
a biasing member received against an end face of the non-circular geometrically shaped head and an opposite end abutting the stepper motor, the biasing member applying a biasing force to the valve member to eliminate a thread clearance between the threaded shaft and the threaded bore of the valve member permitting the valve member to be repeatedly positioned in an open position by a predetermined number of rotations of the stepper motor which can vary by a pitch of the threads.

27. The flow control valve of claim 25, wherein the first and second seat engagement members extend radially outwardly from the valve member to sealingly engage with the first and second seat member when the valve body in set in the closed position.

28. The flow control valve of claim 27, wherein a diameter of the first and second pistons and a diameter of the first and second seat engagement members are substantially equal such that a pressurized fluid force acting against the first piston is balanced by a pressurized fluid force acting against the first and second seat engagement members when the valve body is set in the closed position.

29. The flow control valve of claim 27, wherein a diameter of the first piston is substantially equal to a diameter of the second piston such that a pressurized fluid force acting against the first piston is balanced by a pressurized fluid force acting against the second piston when the valve is set in the open position.

30. The flow control valve of claim 25, wherein the valve member is a spool member having a diameter of the first and second pistons and a diameter of the first and second seat engagement members being substantially equal.

31. The flow control valve of claim 25, wherein the valve member is a compound poppet member having a diameter of the first and second seat engagement members larger than a diameter of the first and second seat members.

* * * * *